US012179372B2

(12) United States Patent
Chen et al.

(10) Patent No.: US 12,179,372 B2
(45) Date of Patent: Dec. 31, 2024

(54) GUARD TO PROTECT A USER WHILE CUTTING FOOD

(71) Applicants: Ruixi Austin Chen, Temple City, CA (US); Hugo Chi Yan Tam, Chicago, IL (US)

(72) Inventors: Ruixi Austin Chen, Temple City, CA (US); Hugo Chi Yan Tam, Chicago, IL (US)

(73) Assignee: March Design LLC, Itasca, IL (US)

( * ) Notice: Subject to any disclaimer, the term of this patent is extended or adjusted under 35 U.S.C. 154(b) by 258 days.

(21) Appl. No.: 17/497,153

(22) Filed: Oct. 8, 2021

(65) Prior Publication Data

US 2023/0111827 A1 Apr. 13, 2023

(51) Int. Cl.
*B26B 29/02* (2006.01)

(52) U.S. Cl.
CPC .................................... *B26B 29/02* (2013.01)

(58) Field of Classification Search
CPC ...................................................... B26B 29/02
USPC ................... 30/124, 134, 289, 114; 269/87.2
See application file for complete search history.

(56) References Cited

U.S. PATENT DOCUMENTS 1,578,295 A 3/1926 Swihart
1,703,154 A * 2/1929 Lanzkron .............. B26B 29/063 D7/673
2,339,909 A * 1/1944 Bucht ........................ B44C 7/02 269/254 R
2,354,968 A 8/1944 Pickering
D161,453 S * 1/1951 Hvale ............................ D7/641
3,816,919 A * 6/1974 Portnoy ................. A61B 17/32 606/152
4,191,008 A 3/1980 Smith
4,195,827 A * 4/1980 Lyman ................ B23D 51/025 269/2
4,399,989 A * 8/1983 Baillie .................. B26B 29/063 269/238
4,580,343 A * 4/1986 Bell, Jr. ................ B26B 29/063 D7/673
4,601,102 A 7/1986 Phillips
4,627,339 A 12/1986 Bushman
4,707,920 A 11/1987 Montgomery
4,948,106 A * 8/1990 Popeil ...................... B26D 3/30 83/762
D316,657 S * 5/1991 Mulherin ....................... D7/673
D366,814 S * 2/1996 Stroecker ....................... D7/641
D371,722 S * 7/1996 Chao .............................. D7/601
D371,727 S 7/1996 Gebhardt (Continued)

*Primary Examiner* — Omar Flores Sanchez
(74) *Attorney, Agent, or Firm* — Brie A. Crawford; Crawford Intellectual Property Law LLC

(57) ABSTRACT

A guard to protect a user while cutting food ("guard") has an outer body, a plurality of sides, and at least one grip to securely hold a piece of food within the guard. A plate is secured to the bottom of the outer body to add a further layer of protection. It is preferred that the outer body of the guard is made of a flexible material so that the sides can flex inwardly to accommodate different sizes of food. A method for using the guard to cut food has the food being placed inside the guard, the user gripping the guard and flexing the sides inwardly so that the at least one grip forms a secure connection with the outer surface of the food, and cutting the food such that the plate adds a layer of protection between the cutting instrument and the user.

11 Claims, 9 Drawing Sheets

(56) References Cited

U.S. PATENT DOCUMENTS

| | | | | | |
|---|---|---|---|---|---|
| 5,533,442 | A | | 7/1996 | Tateno | |
| 5,628,247 | A | | 5/1997 | Palumbo et al. | |
| 5,718,158 | A | * | 2/1998 | Rogge | A21C 15/04 83/870 |
| 5,819,629 | A | * | 10/1998 | Sarich | B26B 29/063 83/762 |
| 5,927,701 | A | * | 7/1999 | Chapman | B26D 3/30 269/295 |
| 5,996,482 | A | | 12/1999 | Kirk et al. | |
| 6,202,529 | B1 | * | 3/2001 | Hodsdon | B26B 29/063 83/761 |
| 6,389,944 | B1 | * | 5/2002 | Davidson | B26D 3/30 D7/673 |
| 6,659,406 | B2 | * | 12/2003 | Tsuchida | A47J 47/16 248/37.3 |
| 6,796,224 | B2 | | 9/2004 | Ascari et al. | |
| 6,964,100 | B1 | | 11/2005 | Musland | |
| D515,877 | S | * | 2/2006 | Czepowicz | D7/619.1 |
| 7,007,583 | B1 | * | 3/2006 | Fiola | B26B 29/063 83/870 |
| 8,215,218 | B2 | * | 7/2012 | Al-Heraibi | B26D 1/30 30/296.1 |
| 8,272,631 | B2 | * | 9/2012 | Gannon | A47J 43/18 269/90 |
| 8,678,366 | B2 | * | 3/2014 | Bowers | B25H 1/08 269/902 |
| 8,726,799 | B2 | | 5/2014 | Prommel et al. | |
| 8,778,418 | B2 | | 7/2014 | Bisterfeld Von Meer | |
| 8,967,039 | B2 | | 3/2015 | Moore | |
| 9,192,181 | B2 | | 11/2015 | Rommens et al. | |
| 9,839,231 | B2 | | 12/2017 | Ashourian et al. | |
| 10,201,249 | B2 | * | 2/2019 | Bagley | B26D 3/30 |
| 11,044,860 | B2 | | 6/2021 | Tolla et al. | |
| 2020/0246992 | A1 | * | 8/2020 | Ritter | B26B 29/02 |
| 2023/0111827 | A1 | * | 4/2023 | Chen | B26B 29/02 83/13 |

* cited by examiner

GUARD TO PROTECT A USER WHILE CUTTING FOOD

FIELD OF THE INVENTION

This invention relates to a guard to protect a user while cutting food and more particularly, a guard to protect a user while cutting food that has an outer body and a series of grips to securely hold a piece of food inside the guard and an plate to protect the user while cutting food.

BACKGROUND OF THE INVENTION

It is often necessary to cut many foods such as fruits and vegetables. When cutting foods, it is necessary to use a knife or other cutting instrument (hereinafter "cutting instrument") that is sharp enough to penetrate any portion of the food such as the outer coating and the inner flesh of the food. However, the sharpness of the cutting instrument can be dangerous to the user and may cause harm to the user if it contacts the user's flesh. A guard to protect a user while cutting food that allows the user to cut the food and protects the user simultaneously will be a useful invention.

It may be necessary to stabilize food while cutting it to reduce or eliminate movement. This can be especially true with food that is round, wet, has a slippery outer surface, or is otherwise subject to rolling or other movement. In order to stabilize the food, the user may need to hold or grip the food while cutting. Holding or gripping the food can create a more stable position, but can also subject the user's hand or body to close proximity to a sharp cutting instrument and can pose a safety risk. A guard to protect a user while cutting food that allows the user to hold or grip the food while simultaneously protecting the user's hand or body will be a useful invention.

A user may encounter foods of different sizes that need to be cut. It may not be convenient or practical to have multiple devices of different sizes to accommodate various sizes of food. A guard to protect a user while cutting food that allows the user to hold or grip the food securely and can accommodate for different sizes of food will be a useful invention.

SUMMARY OF THE INVENTION

An objective of the present invention is the provision of a guard to protect a user while cutting food that protects the user's hand or body while cutting the food.

Another objective of the present invention is the provision of a guard to protect a user while cutting food that allows the user to grip the food while the guard protects the user's hand or body from the cutting instrument.

Moreover, an objective of the present invention is the provision of a guard to protect a user while cutting food that can accommodate foods of different sizes.

A method of using the guard to protect a user while cutting food is also disclosed.

Other objectives and advantages of the present invention will become apparent to those of ordinary skill in the art upon review of the disclosure herein.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
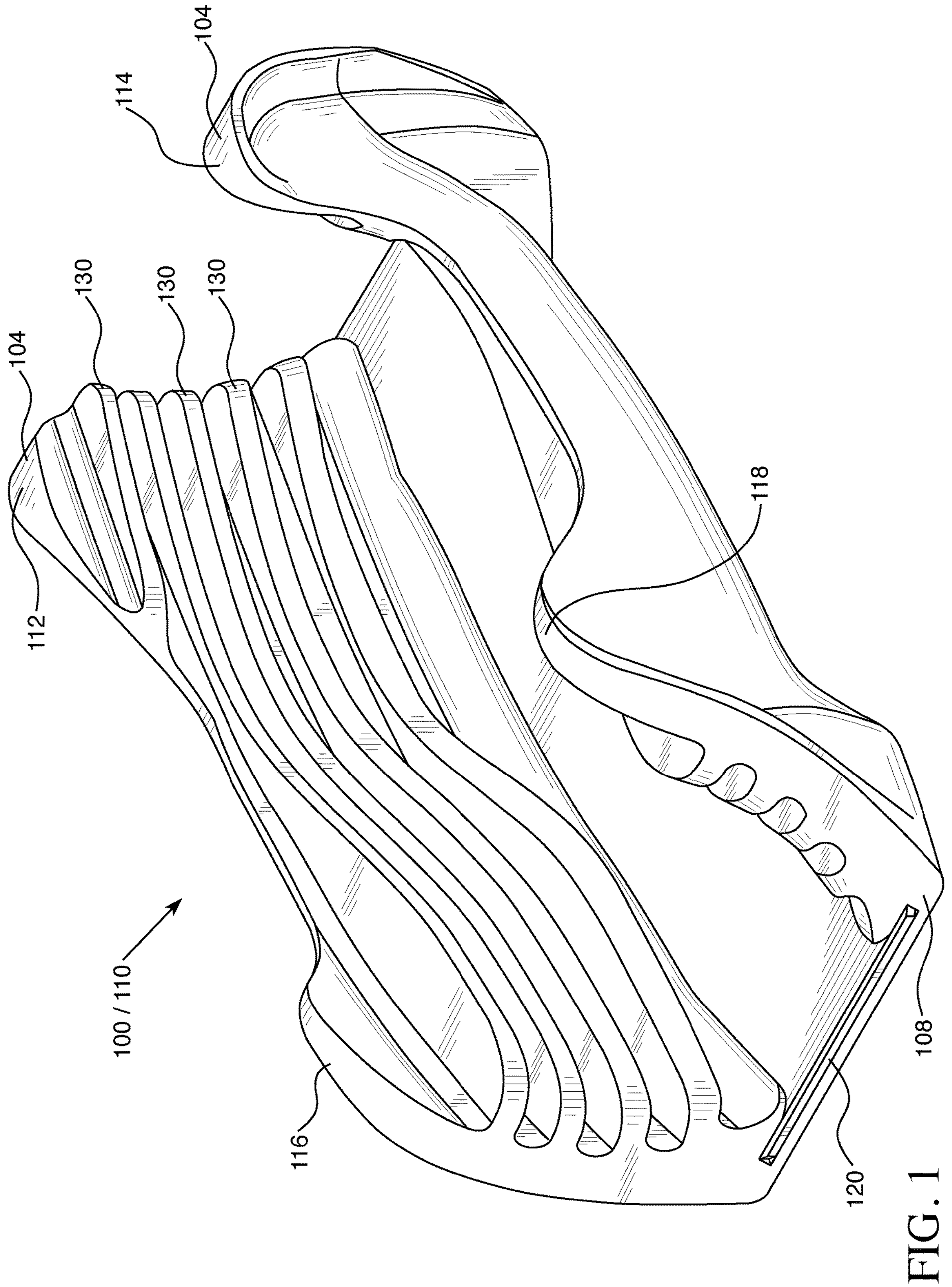
FIG. 1 depicts a perspective view of a first embodiment of a guard to protect a user while cutting food 100.
Figure 2:
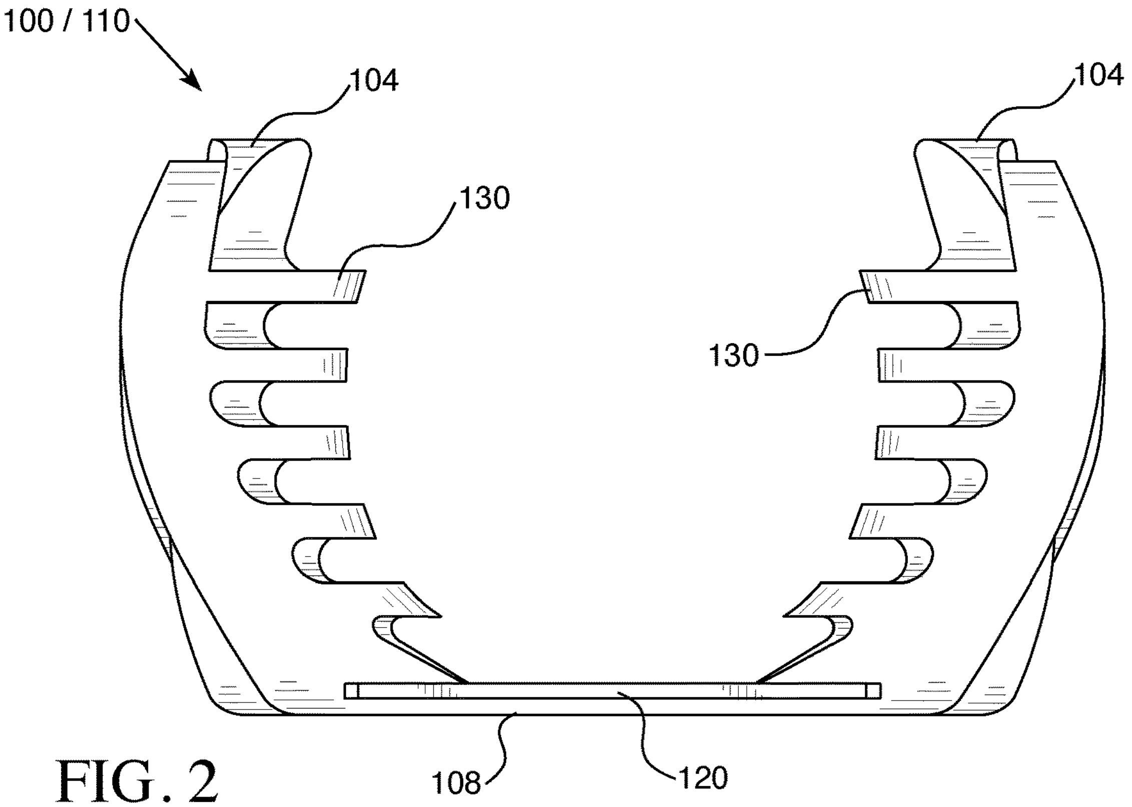
FIG. 2 depicts a front elevation view of a guard to protect a user while cutting food 100.
Figure 3:
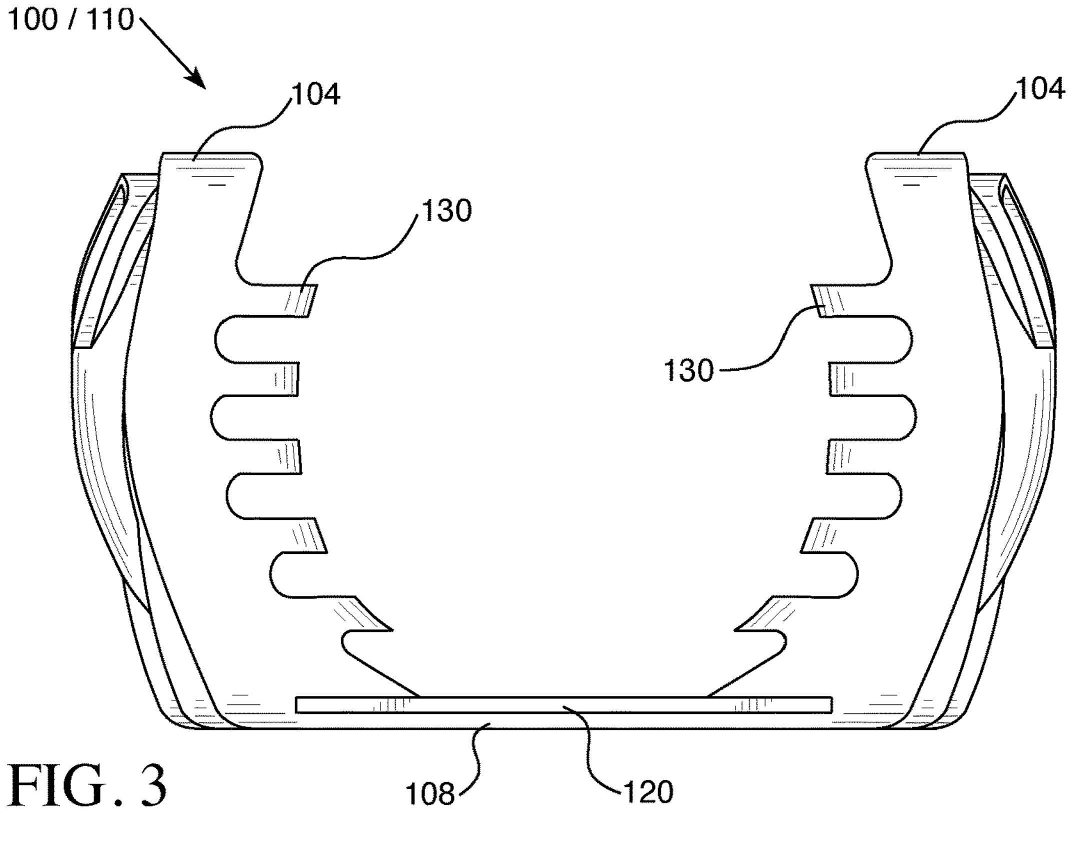
FIG. 3 depicts a rear elevation view of a guard to protect a user while cutting food 100.
Figure 4:
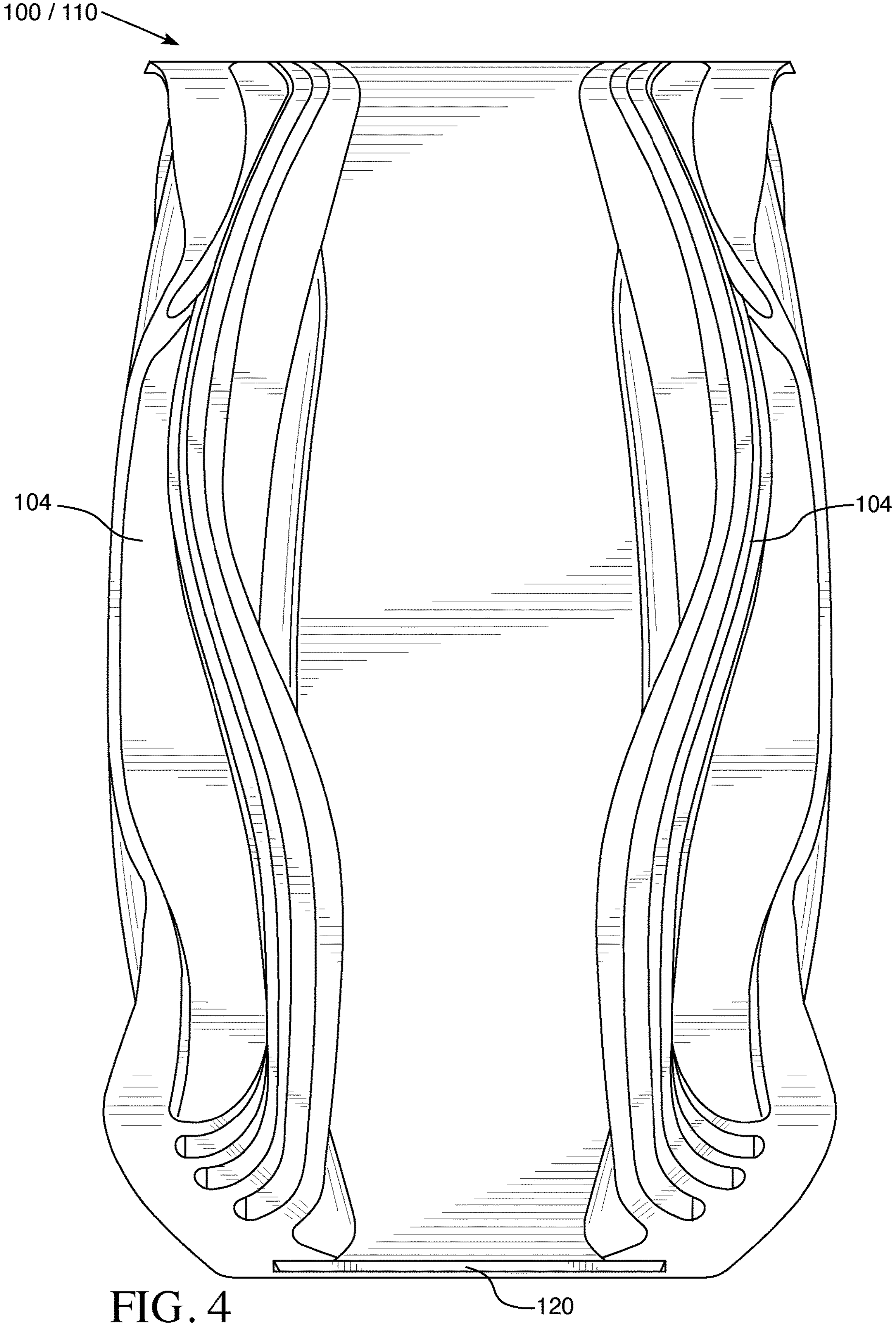
FIG. 4 depicts a top plan view of a guard to protect a user while cutting food 100.
Figure 5:
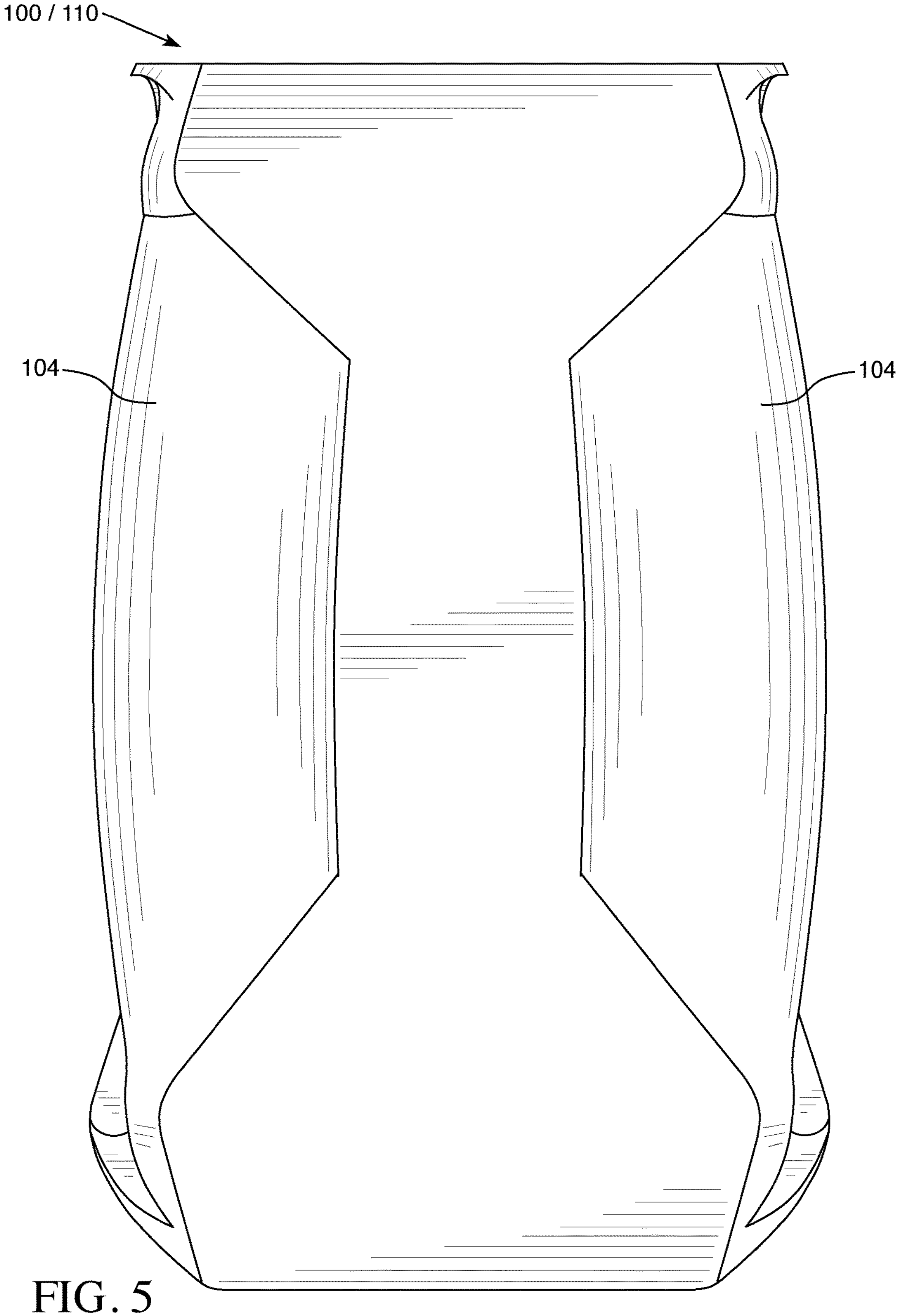
FIG. 5 depicts a bottom plan view of a guard to protect a user while cutting food 100.
Figure 6:
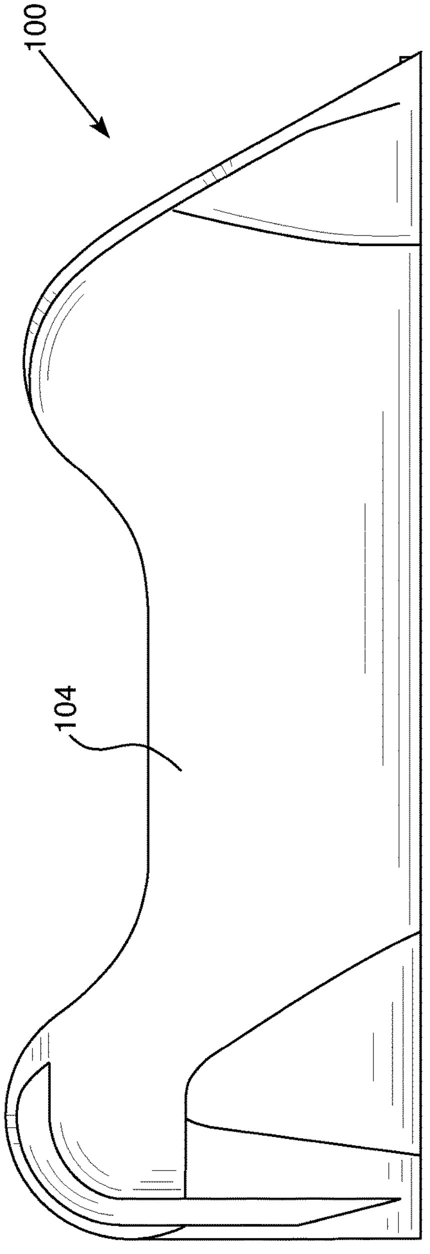
FIG. 6 depicts a left elevation view of a guard to protect a user while cutting food 100.
Figure 7:
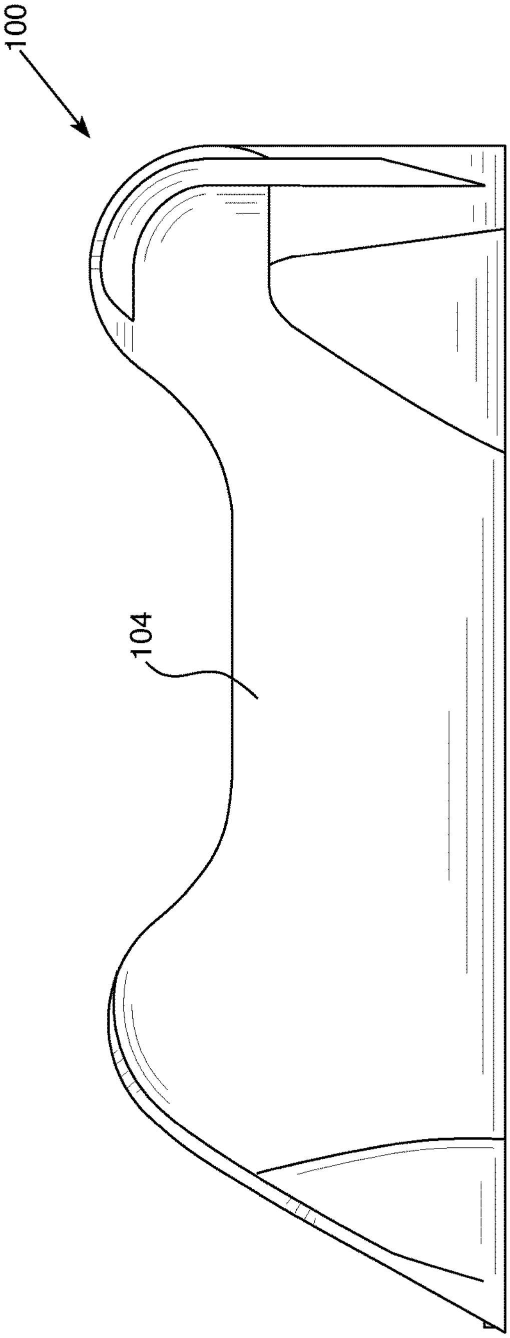
FIG. 7 depicts a right elevation view of a guard to protect a user while cutting food 100.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

Now adding FIG. 1, FIG. 2, FIG. 3, FIG. 4, FIG. 5, FIG. 6, FIG. 7, and FIG. 8 to the consideration, the guard to protect a user while cutting food 100 (hereinafter "guard 100") can be clearly seen. Guard 100 has outer body 110, plate 120, and a series of grips 130.

Outer body 110 has sides 104 and on the interior of sides 104 are one or more grips 130. In the depicted embodiment, the sides are opposed on a pair of lateral sides of the outer body 110. Grips 130 extend from the interior of sides 104 to the interior of guard 100 and provide a secure attachment between guard 100 and food 106. It is noted that two sides 104 are depicted, but any number of sides 104 can be used and all such numbers are encompassed by this disclosure.

Outer body 110 has corners 112, 114, 116, and 118 which may serve as gripping points for the user's thumb and fingers (hereinafter "digits"). Guard 100 is meant to be able to be used by either the left hand or the right hand of the user so any digit can be placed on any of corners 112, 114, 116, and 118 to accommodate for the position of guard 100 and the user's preferences. It is noted that any number or combination of digits and any number or combination of corners 112, 114, 116, or 118 can be used and all such numbers and combinations are encompassed by this disclosure. It is not required that the user grip guard 100 at any number or combination of corners 112, 114, 116, or 118.

Outer body 110 has bottom 108 and on the top side of bottom 108 is plate 120. Plate 120 serves to add an extra layer of protection between the user's hand or body and cutting instrument 102. Plate 120 also protects outer body 110 from being damaged by cutting instrument 102.

Now adding FIG. 9 and FIG. 10 to the consideration, a second embodiment of a guard to protect a user while cutting food 200 (hereinafter "guard 200") can be clearly seen. Guard 200 has outer body 210, plate 220, and a series of grips 230.

Outer body 210 has sides 204 and on the interior of sides 204 are one or more grips 230. In the depicted embodiment, the sides are opposed on a pair of lateral sides of the outer body 210. Grips 230 extend from the interior of sides 204 to the interior of guard 200 and provide a secure attachment between guard 200 and food 106. It is noted that two sides 204 are depicted, but any number of sides 204 can be used and all such numbers are encompassed by this disclosure.

Outer body 210 has corners 212, 214, 216, and 218 which may serve as gripping points for the user's digits. Guard 200 is meant to be able to be used by either the left hand or the right hand of the user so the user's digits can be placed on any of corners 212, 214, 216, and 218 to accommodate for the position of guard 200 and the user's preferences. It is noted that any number or combination of digits and any number or combination of corners 212, 214, 216, or 218 can be used and all such numbers and combinations are encompassed by this disclosure. It is not required that the user grip guard 200 at any number or combination of corners 212, 214, 216, or 218.

Outer body 210 has bottom 208 and on the top side of bottom 208 is plate 220. Plate 220 serves to add an extra layer of protection between the user's hand or body and cutting instrument 102. Plate 220 also protects the outer body 210 from being damaged by the cutting instrument 102.

Figure 8:
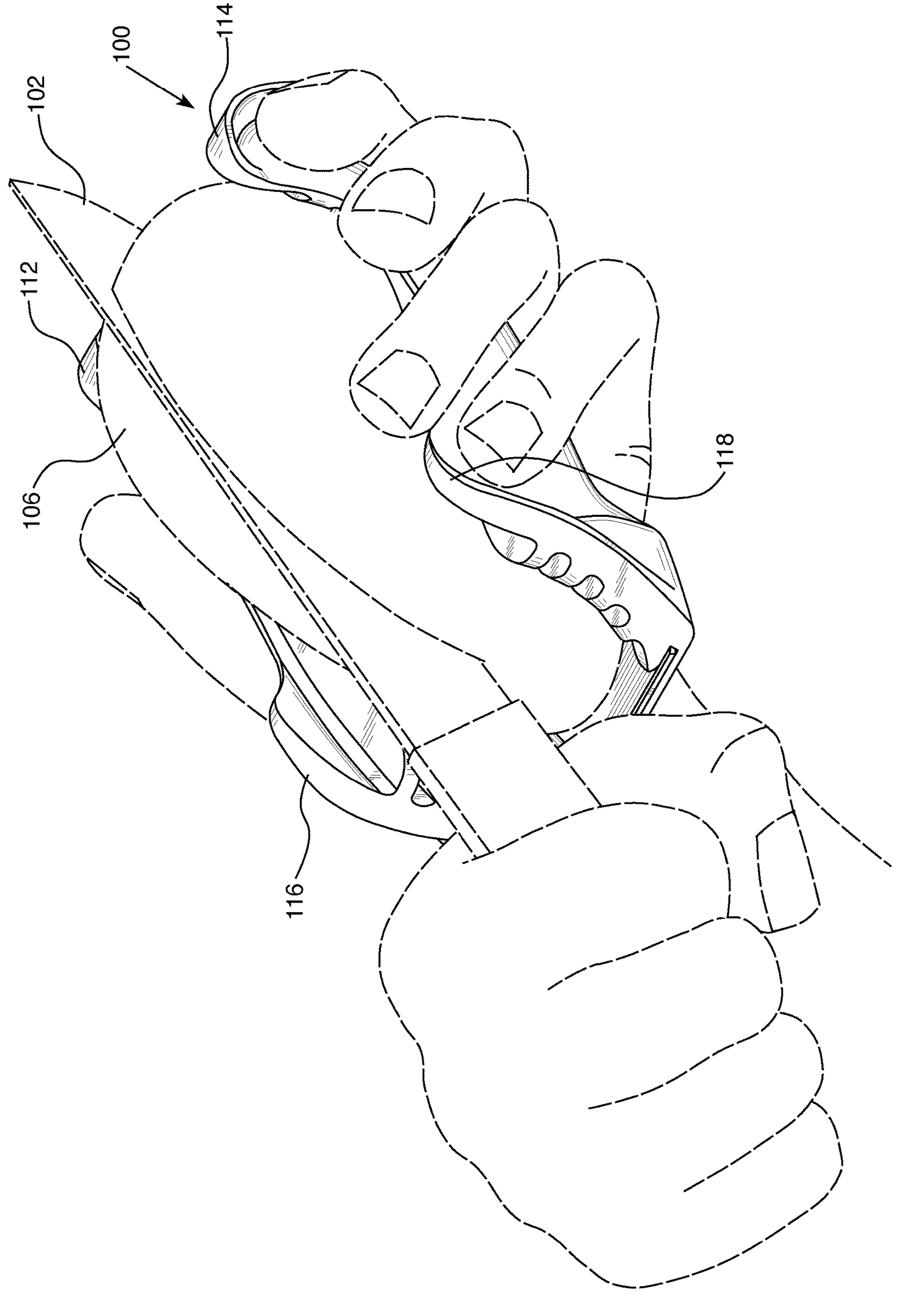
FIG. 8 depicts a perspective view of a guard to protect a user while cutting food 100 in use, with the food 106, the user's hand, and cutting instrument 102 depicted in phantom.

One option for use is for the user to place the food 106 to be cut inside of guard 100/200 between sides 104/204 and on top of plate 120/220. The user grips guard 100/200 (as seen in FIG. 8 and FIG. 9) and the user may, optionally, place any number or combination of their digits on corners 112/212, 114/214, 116/216, or 118/218 to grip guard 100/200. Sides 104/204 of guard 100/200 are pressed or flexed toward food 106 and grips 130/230 contact food 106 to provide a more stable connection between food 106 and guard 100/200. The user is able to use cutting instrument 102 to cut food 106 and remove any seeds, pits, or other unwanted portion and their hand or body is protected by plate 120/220 and outer body 110/210.

A second option for use is for the user to place the food 106 to be cut inside of guard 100/200 between sides 104/204 and on top of plate 120/220. The user grips guard 100/200 and the user may, optionally, place any number or combination of their digits on sides 104/204 between corners 112/212, 114/214, 116/216, or 118/218. Sides 104/204 of guard 100/200 are pressed or flexed toward food 106 and grips 130/230 contact food 106 to provide a more stable connection between food 106 and guard 100/200. The user is able to use cutting instrument 102 to cut the food 106 and remove any seeds, pits, or other unwanted portion and their hand or body is protected by plate 120/220 and outer body 110/210.

Another option for use, is for the user to place guard 100/200 on a working surface such as a cutting board, a counter, a table, a food preparation table, or any other suitable surface. The user places the food 106 to be cut inside of guard 100/200 between sides 104/204 and on top of plate 120/220. The user grips guard 100/200 and the user may, optionally, place any number or combination of their digits on corners 112/212, 114/214, 116/216, or 118/218 to grip guard 100/200. Or, the user grips guard 100/200 and the user may, optionally, place any number or combination of their digits sides 104/204 between corners 112/212, 114/214, 116/216, or 118/218. In either case, sides 104/204 of guard 100/200 are pressed or flexed toward food 106 and grips 130/230 contact the food 106 to provide a more stable connection between the food 106 and the guard 100/200. The user is able to use cutting instrument 102 to cut food 106 and remove any seeds, pits, or unwanted portion and their hand or body is protected by outer body 110/210.

It is preferred, but not required, that the outer body 110/210 be made of a flexible material such as, but limited to silicone, so that when the food 106 is placed inside of guard 100/200, the sides 104/204 of guard 100/200 can be moved or flexed inwardly toward food 106, if the grips 130/230 are not touching food 106 before the flexing of sides 104/204, to provide a more stable connection between guard 100/200 and food 106. The pressing or flexing of sides 104/204 allow guard 100/200 to accommodate different sizes of food 106. Silicone is meant to be example only and is not meant to limit the scope of the invention and all suitable materials can be used and are encompassed by this disclosure. It is preferred that any material used for guard 100/200, including silicone, be food grade or otherwise suitable for use with food and food-related products.

It is preferred that plate 120/220 be made of a metal, such as, but not limited to stainless steel or titanium, so that it can provide protection from the cutting instrument 102 during use to both the outer body 110/210 and the user. Stainless steel and titanium are meant to be exemplary only and are not meant to limit the scope of the invention and all suitable materials, both metal and nonmetal, can be used are encompassed by this disclosure.

Plate 120/220 can be attached to outer body 110/210 in any suitable fashion including, but not limited to, molding or adhesive. If an adhesive is used, it is preferred that it be an adhesive that is food-safe or otherwise safe to use in connection with food products. Molding and adhesives are meant to be exemplary only and any suitable attachment mechanism can be used and is encompassed by this disclosure.

Figure 11:
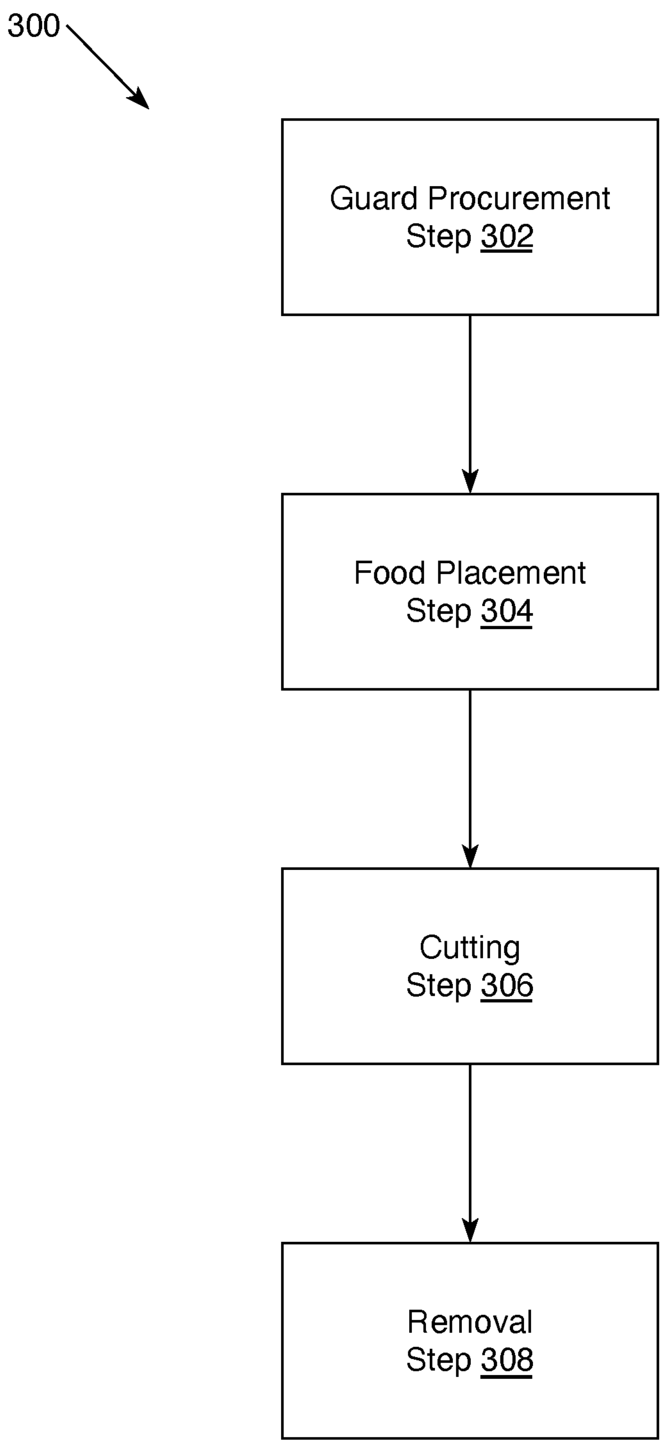
FIG. 11 depicts a block diagram of method 300.

Now adding FIG. 11 to the consideration, method 300 can be clearly seen. Method 300 has the following steps. As will be obvious to persons of ordinary skill in the art, the steps, or steps equivalent thereto, may be practiced in any reasonable order which will produce the desired result.

STEP 302 is the guard procurement step. In this STEP 302, a guard 100 or 200, one or more pieces of food 106, and a cutting instrument 102 are obtained.

STEP 304 is the food placement step. In this STEP 304, the piece of food 106 to be cut is placed inside of guard 100/200. The piece of food 106 is placed in the center of guard 100/200, between both sides 104/204, and above plate 120/220. Food 106 may be positioned in guard 100/200 before or after the user grips guard 100/200.

Figure 9:
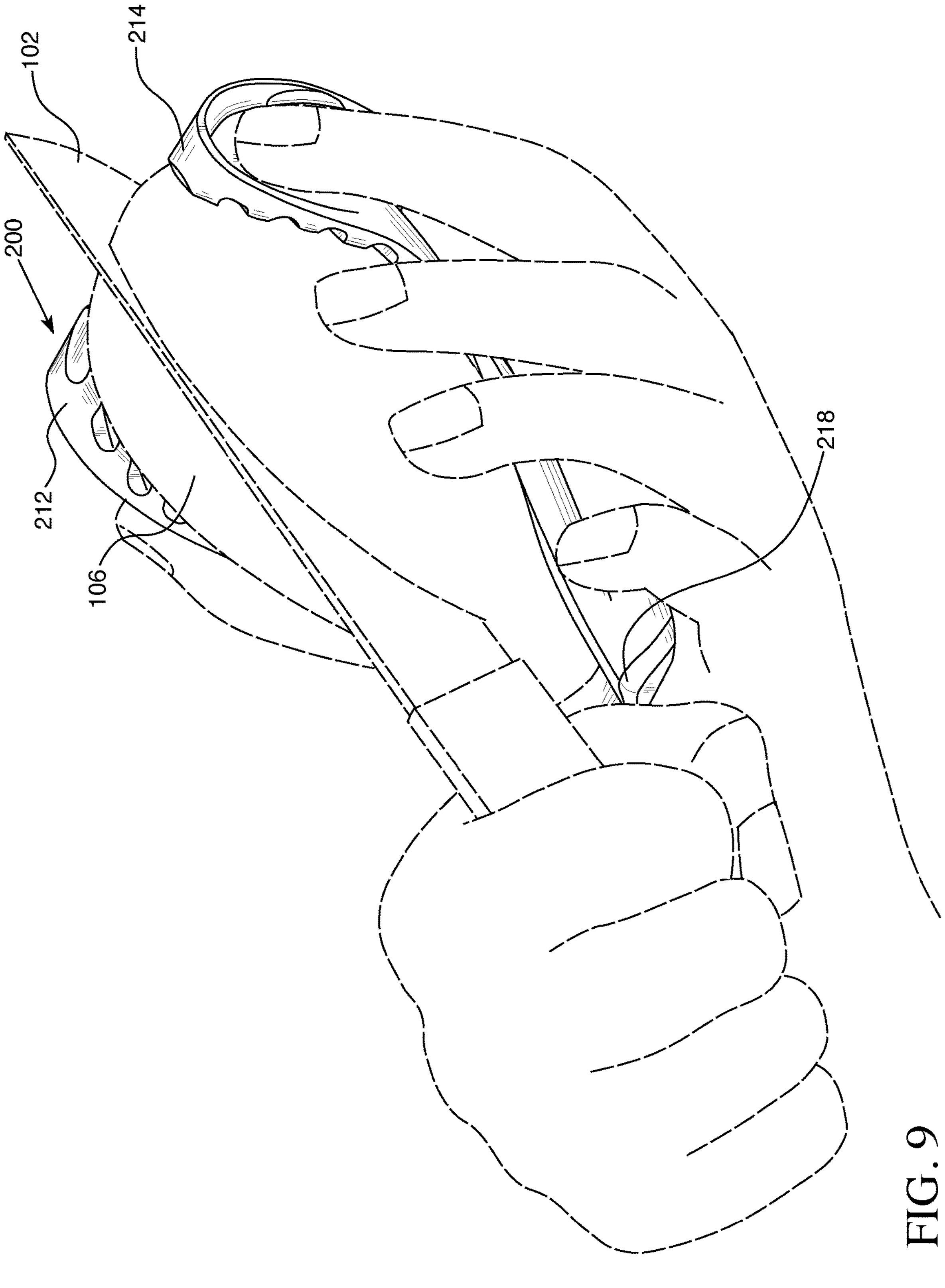
FIG. 9 depicts a perspective view of a second embodiment of a guard to protect a user while cutting food 200 in use, with the food 106, the user's hand, and cutting instrument 102 depicted in phantom.
Figure 10:
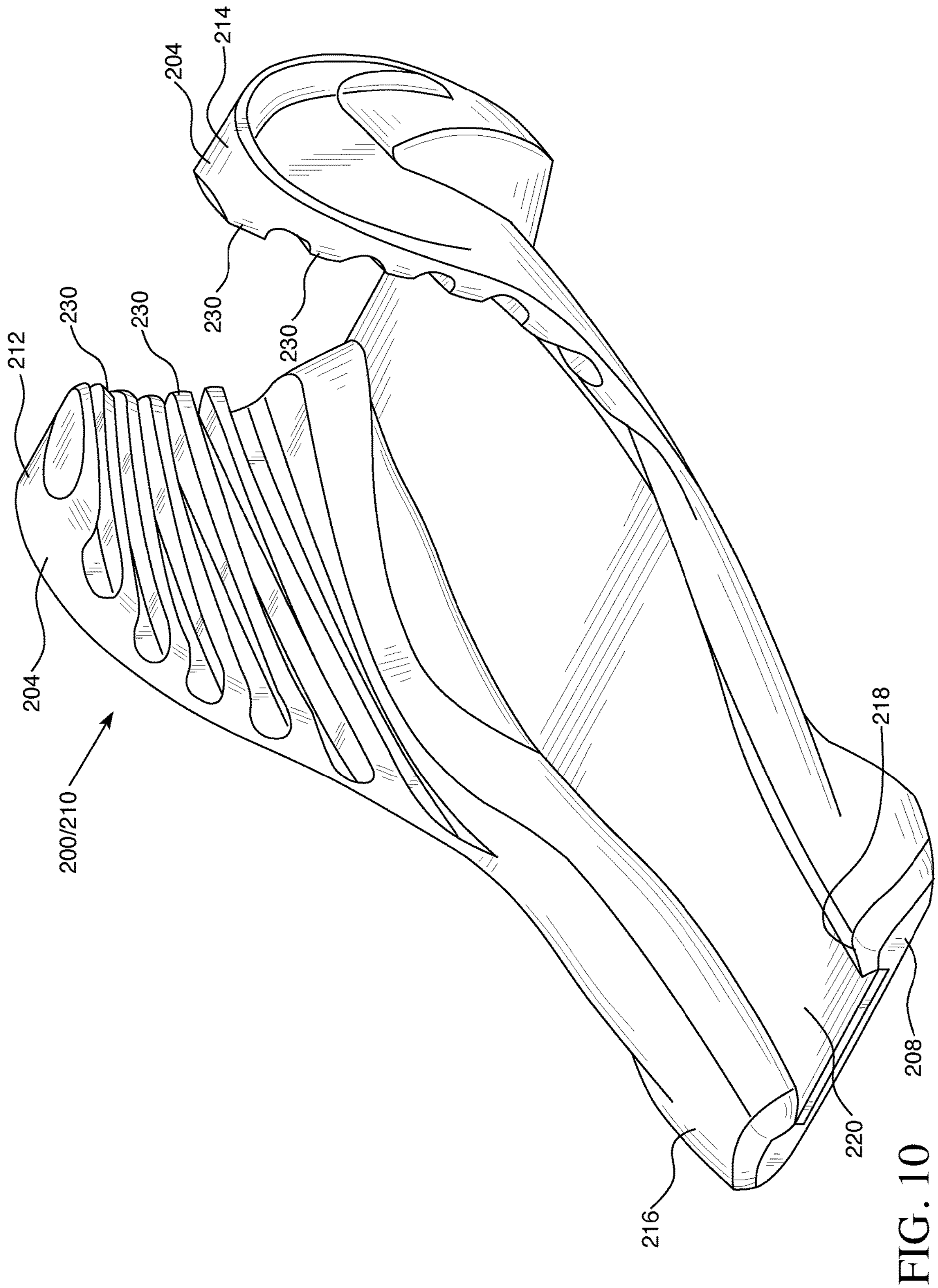
FIG. 10 depicts a perspective view of a second embodiment of a guard to protect a user while cutting food 200.

One option to grip guard 100/200 is for the user to grip guard 100/200 as seen in FIGS. 8 and 9 and use any number or combination of their digits and any number or combination of corners 112/212, 114/214, 116/216, and 118/218 to securely grip guard 100/200.

Or, another option for the user to grip guard 100/200, is for the user to place any number or combination of their digits on sides 104/204 between corners 112/212, 114/214, 116/216, or 118/218.

Or, a third option to grip guard 100/200 is for the user to place guard 100/200 on a working surface such as a cutting board, a counter, a table, a food preparation table, or any other suitable surface. The user grips guard 100/200 and the user places any number or combination of their digits on corners 112/212, 114/214, 116/216, or 118/218 to grip guard 100/200. Or alternatively, the user grips guard 100/200 and the user places any number or combination of their digits on sides 104/204 between corners 112/212, 114/214, 116/216, or 118/218. If the food to be cut is not placed inside of guard 100/200 at this time, food 106 is placed inside of guard 100/200 before proceeding to the next step.

Sides 104/204 are flexed inwardly such that grips 130/230 are touching and securely holding food 106 inside. If the grips 130/230 are touching the food 106 before sides 104/204 are flexed inwardly, it may not be necessary to flex sides 104/204 inwardly.

STEP 306 is the cutting step. In this STEP 306, a cutting instrument 102 is used to cut the food 106 and the guard 100/200 protects the user from the cutting instrument 102.

STEP 308 is the removal step. In this STEP 308, the food 106 is removed from the guard 100/200.

STEPS 304 to 308 can be repeated as many times as desired and it may be necessary to repeat STEP 302 to obtain additional cutting instruments 102 and food 106.

While various embodiments and aspects of the present invention have been described above, it should be understood that they have been presented by way of example only, and not limitation. Thus, the breadth and scope of the present invention should not be limited by any of the above exemplary embodiments.

This application-taken as a whole with the abstract, specification, claims, and drawings being combined-provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

The invention claimed is:

1. A guard to protect a user while cutting food comprising:

a) the guard having an outer body;

b) the outer body having at least one grip on an inner surface;

c) a plate;

d) the outer body having two sides, wherein the two sides are opposed on a pair of lateral sides of the outer body;

e) at least one grip extending from each of the two sides toward the center of the guard;

f) the outer body being made of a flexible material, wherein the flexible material allows a piece of food to be inserted into the guard without pulling the two sides away from each other and then, the two sides being flexed inwardly toward the piece of food to secure the piece of food in the guard; and g) the outer body being configured to be cradled by a hand of a user, at an end where the two sides join, and flexed inwardly by the hand of the user.

2. The guard of claim 1 further comprising:

a) the plate being positioned on a top surface of a bottom surface of the outer body;

b) the outer body being a unitary piece; and c) the two sides having an opening, wherein the opening allows the knife to be inserted into the opening to cut the food without using a guide.

3. The guard of claim 1 further comprising:

a) the plate being made of a metal, wherein the plate is configured to provide protection between a cutting instrument and a user.

4. The guard of claim 2 further comprising:

a) the plate being made of a metal, wherein the plate is configured to provide protection between a cutting instrument and a user.

5. The guard of claim 1 further comprising:

a) the outer body having at least two corners, wherein the at least two corners, on opposing sides of the outer body, are configured to be gripped by at least two digits of a user, further wherein the at least two corners are configured to allow the user to grip the at least two corners and press the two sides inwardly toward each other while a hand of the user is cradling the outer body.

6. The guard of claim 2 further comprising:

a) the outer body having at least two corners, wherein the at least two corners, on opposing sides of the outer body, are configured to be gripped by at least two digits of a user, further wherein the at least two corners are configured to allow the user to grip the at least two corners and press the two sides inwardly toward each other while a hand of the user is cradling the outer body.

7. The guard of claim 3 further comprising:

a) the outer body having at least two corners, wherein the at least two corners, on opposing sides of the outer body, are configured to be gripped by at least two digits of a user, further wherein the at least two corners are configured to allow the user to grip the at least two corners and press the two sides inwardly toward each other while a hand of the user is cradling the outer body.

8. The guard of claim 4 further comprising:

a) the outer body having at least two corners, wherein the at least two corners, on opposing sides of the outer body, are configured to be gripped by at least two digits of a user, further wherein the at least two corners are configured to allow the user to grip the at least two corners and press the two sides inwardly toward each other while a hand of the user is cradling the outer body.

9. A method of using a guard to protect a user while cutting food comprising:

a) obtaining a guard, at least one piece of food, and at least one cutting instrument, wherein the guard has an outer body and the outer body has two sides, and further wherein the two sides are opposed on a pair of lateral sides of the outer body;

b) cradling the guard, at an end where the at least two sides join, wherein the guard is configured to be cradled by a hand of a user;

c) placing the at least one piece of food within the outer body and between the two sides of the guard without pulling the two sides away from each other;

d) flexing the two sides inwardly toward the at least one piece of food, wherein each of the at least one grip extends from each of the two sides and contacts the at least one piece of food;

e) using the at least one cutting instrument to cut the at least one piece of food; and f) removing the at least one piece of food from the guard once the at least one piece of food has been cut.

10. The method of claim 9 further comprising:

a) gripping at least two corners on an outer body of the guard, wherein the at least two corners are configured for each corner to receive at least one digit of the user, further wherein the at least two corners are configured to allow the user to grip the at least two corners and flex the two sides toward each other while a hand of the user is cradling the outer body; and b) inserting a knife through an opening formed by the two sides, wherein the opening allows the at least one piece of food to be inserted into the opening to cut the at least one piece of food without using a guide.

11. The method of claim 9 further comprising:

a) gripping at least two points and at least one point, of the at least two points, being on each of the at least two sides on the outer body of the guard, wherein each of the at least two points are between at least two corners, further wherein the at least two sides are configured to allow the user to grip the at least two points on each of the two sides and flex the two sides toward each other while a hand of the user is cradling the outer body; and b) inserting a knife through an opening formed by the two sides, wherein the opening allows the at least one piece of food to be inserted into the opening to cut the at least one piece of food without using a guide.

* * * * *